Patented Jan. 20, 1942

2,270,380

UNITED STATES PATENT OFFICE 2,270,380

SUGAR DERIVATIVES OF NONSTEROIDS HAVING THE EFFECT OF STEROID HORMONES, AND PROCESS OF MAKING THE SAME

Karl Miescher, Riehen, and Werner Fischer and Jules Heer, Basel, Switzerland, assignors, by mesne assignments, to Ciba Pharmaceutical Products, Incorporated, Summit, N. J., a corporation of New Jersey No Drawing. Application February 21, 1939, Serial No. 257,736. In Switzerland March 16, 1938

12 Claims. (Cl. 260—210)

This invention relates to the manufacture of new sugar derivatives of non-steroids having the effect of steriod hormones by treating such non-steroids with an etherifying sugar derivative in the presence of a catalyst useful in furthering etherification.

As parent material there may be used any non-steroid, having the effect of steriod hormones, which contains at least one reactive hydroxyl group. The following compounds may be especially named as examples:—alkyl- or alkenyl- poly-phenols such as 4:4'-dioxy-$\alpha:\beta'$-diethyl-diphenylethane, 4:4' - $\alpha:\beta$-tetroxy-$\alpha:\beta$-diethyldiphenylethane, anol and dianols, hydroxy-compounds of the stilbene series such as 4:4'-dioxystilbene, $\alpha:\alpha'$-dialkyl-, -dialkenyl-, -dialkinyl-, -alkyl-aryl or -diaryl-4:4'-dioxystilbene such as $\alpha:\alpha'$-dimethyl-4:4'-dioxystilbene, $\alpha:\alpha'$ - diethyl - 4:4' - dioxystilbene, $\alpha$-methyl-$\alpha'$-ethyl-4:4'-dioxystilbene, $\alpha:\alpha'$ - diisopropyl - 4:4'-dioxystilbene, $\alpha:\alpha'$ - diethinyl-4:4'-dioxystilbene or $\alpha:\alpha'$-diphenyl-4:4'-dioxystilbene, further $\alpha$-mono-alkyl-, -alkenyl-, alkinyl- or -aryl-4:4'-dioxystilbene such as methyl-, ethyl-, ethenyl-, ethinyl-, allyl- or phenyl-4:4'-dioxystilbenes. Further also oxy-compounds of the polyphenylethane series which are substituted in $\alpha$- and/or $\alpha'$-position by alkenyl, alkinyl or alkylides, such as for example 3:4-(4':4''-dioxy-diphenyl)-2:4-hexadiene, 2:3-(4':4''-dioxydiphenyl)-1:3-butadiene, $\alpha:\alpha'$ - diethinyl - 4':4'' - dioxy - diphenylethane, $\alpha:\alpha'$-diallyl-2':2''-dioxydiphenylethane, $\alpha$-ethinyl - 4':4'' - dioxy-diphenylethane, $\alpha$-ethenyl-2'-oxydiphenylethane, ethylidene-4':4'':4'''-trioxy-triphenylethane.

Etherifying sugar derivatives include such sugar derivatives as are capable of etherifying compounds containing hydroxyl-groups. Particular mention is made of the acyl compounds and the acyloxy-halogen compounds of the saccharides, such as for example acetyl glucose, pentacetyl glucose and acetobromo glucose. As saccharides, there may be used for instance mono-, di- or tri-saccharides, such as glucosides, galactosides or galactose-glucosides. The process of the invention may be carried out by known methods in presence of a catalyst useful in furthering etherification, such as are described for example in Richter-Anschütz, Chemie der Kohlenstoffverbindungen, vol. 2, 1st half, page 359 (1935). This text-book describes for example the action of hydrochloric acid on alcoholic sugar solutions, the reaction of alcohols with 1:2-oxides of sugars and the manufacture of phenolglycosides from phenols and sugar acetates by zinc chloride or para-toluene sulfonic acid. But other known catalysts furthering the etherification may also be used, for example silver oxide, silver carbonate, mercury salts such as mercury oxide, mercury acetate (cf. "Berichte" vol. 62, page 990 (1929) and mercury succinate, emulsion and the glucosidase of yeast.

The new compounds may contain one or more saccharide residues in the molecule and also hydroxyl groups which are still free or have been esterified or etherified. The saccharide residue may also be present in the form of derivatives, for instance in the form of their acylates.

The new compounds are characterized by their better solubility in water and are useful in therapeutics.

The following example illustrates the invention:

1 part by weight of 4:4'-dioxy-$\alpha:\beta$-diethylstilbene, 3 parts of penta-acetylglucose and 0.1 part of para-toluenesulfonic acid and 10 parts of benzene are boiled for five hours. The solution is then taken up in benzene and washed with dilute caustic soda lye and water and then dried over sodium sulfate. After evaporating the benzene finally in a vacuum there is obtained the octa-acetyl-bis-glucoside of dioxydiethylstilbene in the form of colorless crystals. F. 227–230°. It may be recrystallized from methanol or ethanol.

The acetyl derivative may be saponified by heating a methanol solution thereof with 1 part of a solution of 1 part of sodium in 100 parts of methanol for a short time. Water is then added, whereby 4:4'-bis-($\beta$-glucoside)-$\alpha:\beta$-diethylstilbene is precipitated in the form of a white powder. It may be recrystallized from butanol and melts with decomposition at about 245°. The saponification may also be effected with other hydrolizing agents, for example sodium hydroxide.

In analogous manner there may be obtained the polysaccharides of for instance 4:4'-bis-($\beta$-lactoside)- or 4:4'-bis-($\beta$-gentiobiosido)-d-glucoside of the same parent material.

The said saccharides can equally well be obtained by way of other etherifying sugar derivatives, such as the corresponding acetohalogen sugars or acetyl sugars even in presence of other catalysts furthering etherification, for instance zinc chloride, silver carbonate, mercury salts such as mercury acetate, mercury oxide and mercury succinate, emulsion or the glucosidase of yeast.

In quite similar manner the sugar derivatives of polyanols, for instance dianol, alkyl-mono- and poly-phenols, such as 4:4'-dioxy-α:β-diethyl-diphenylethane, 4:4'-α:β-tetroxy-α:β-diethyldiphenylethane, oxy-compounds of the polyphenylethane series which are substituted in α- and/or α'-position by alkenyl, alkinyl or alkylides, such as for example α:α'-diethinyl-4':4''-dioxy-diphenylethane, α-ethenyl - 2'-oxy-diphenylethane, α - ethylidene-4':4':4''-trioxy-triphenylethane, may be obtained.

What we claim is:

1. A process for the manufacture of glucoside derivatives comprising treating a non-steroid which is of phenol character and has the effect of steroid hormones and is a member of the group consisting of alkyl- and alkenyl- polyphenols, with an etherifying derivative selected from the group consisting of the acyl and acyloxyhalogen compounds of the saccharides, and with a catalyst useful in furthering etherification.

2. A process for a manufacture as claimed in claim 1, comprising treating the product thus obtained with hydrolizing agents.

3. A process for the manufacture of monosaccharide derivatives comprising treating a non-steroid which is of phenol character and has the effect of steroid hormones and is a member of the group consisting of alkyl- and alkenyl-polyphenols, with an etherifying derivative selected from the group consisting of the acyl and acyloxy-halogen compounds of the saccharides, and with a catalyst useful in furthering etherification.

4. A process for the manufacture of glucoside derivatives of non-steroids having the effect of steroid hormones, comprising treating 4:4'-dioxy-α:β-diethyl-stilbene with an etherifying derivative selected from the group consisting of the acyl and acyloxy-halogen compounds of the saccharides, and with a catalyst useful in furthering etherification.

5. A process for the manufacture of glucoside derivatives of non-steroids having the effect of steroid hormones, comprising treating 4:4'-dioxy-α:β-diethyl-stilbene with a penta-acetylglucose and with a catalyst useful in furthering etherification.

6. A process for the manufacture of new glucoside derivatives of non-steroids having the effect of steroid hormones, comprising treating 4:4'-dioxy-α:β-diethyl-stilbene with a penta-acetylglucose and with para-toluenesulfonic acid.

7. A process for the manufacture of new glucoside derivatives of non-steroids having the effect of derivatives of non-steroids having the effect of steroid hormones, comprising treating 4:4'-dioxy-α:β-diethyl-stilbene with a penta-acetylglucose and with para-toluenesulfonic acid and then treating the product thus obtained with hydrolyzing agents.

8. A process for the manufacture of new glucoside derivatives of non-steroids having the effect of steroid hormones, comprising treating 4:4'-dioxy-α:β-diethyl-stilbene with a penta-acetylglucose and with para-toluenesulfonic acid and then treating the product thus obtained with sodium ethylate.

9. The glucoside derivatives of non-steroids having the effect of steroid hormones and being members of the group consisting of alkyl- and alkenyl-polyphenols.

10. The monosaccharide derivatives of non-steroids having the effect of steroid hormones and being members of the group consisting of alkyl- and alkenyl polyphenols.

11. The monosaccharide derivatives of 4:4'-dioxy-α:β-diethyl-stilbene.

12. The β-glucoside of 4:4'-dioxy-α:β-diethyl-stilbene melting with decomposition at 245° C.

KARL MIESCHER.
WERNER FISCHER.
JULES HEER.